INVENTOR.
WILBERT H. PATTEN
BY
Albert Sperry
ATTORNEY

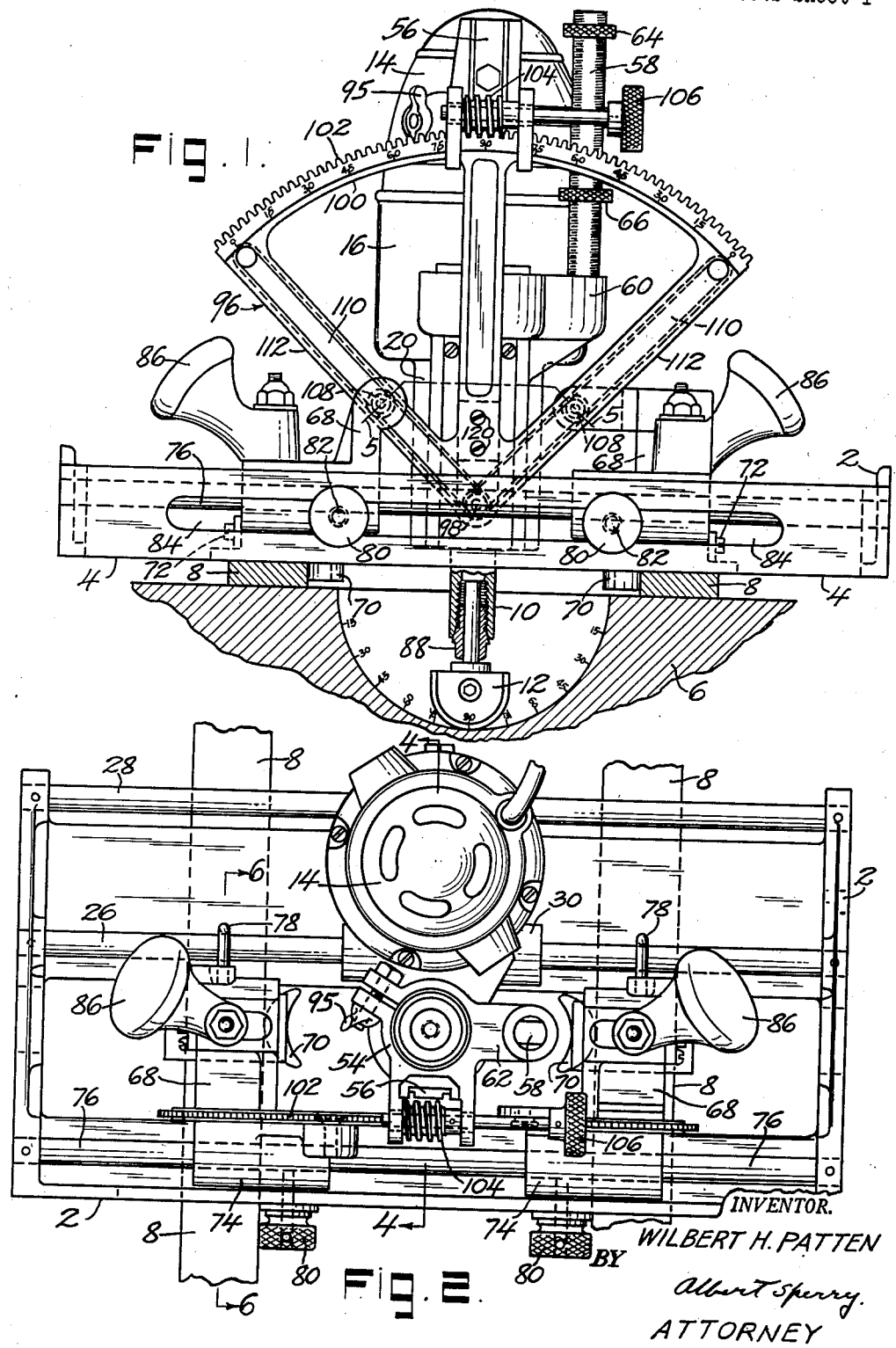

May 25, 1954

W. H. PATTEN 2,679,271

PORTABLE WOODWORKING TOOL

Filed April 27, 1951

INVENTOR.
WILBERT H. PATTEN
BY Albert Sperry
ATTORNEY

Patented May 25, 1954

2,679,271

UNITED STATES PATENT OFFICE 2,679,271

PORTABLE WOODWORKING TOOL

Wilbert H. Patten, Trenton, N. J.

Application April 27, 1951, Serial No. 223,363

12 Claims. (Cl. 144—136)

This invention relates to woodworking tools and is directed particularly to tools designed for accurately forming cavities or contours in a workpiece.

There are many occasions when it is necessary to form curved, rounded or angular shapes in woodworking as exemplified particularly in producing wooden core boxes, molds and patterns. However, because of the unusual shapes and contours which must be produced and the accuracy which has to be maintained such work has usually been done largely by hand and requires outstanding skill and craftsmanship. Such work is therefore time consuming and very expensive to produce.

Those power driven hand tools heretofore in use have been limited in application to the cutting or forming of particular shapes and they have had no positive control or guide means which would insure accuracy of movement of the cutter. They have therefore been limited in their application and have not been capable of general use by semi-skilled workmen.

In accordance with the present invention a novel type of tool is provided which has a power driven cutter but which is portable and thus capable of being operated by hand. At the same time the movement of the cutter is controlled so as to permit routing or cutting of irregular contours with such a high degree of accuracy that substantially all hand work can be eliminated. Furthermore, the tool can be worked rapidly by persons having limited woodworking skill and still produce a finished job which is equal or better than the hand-tooled work heretofore turned out.

These advantages are preferably attained by providing the tool with a bed movable over the work and by employing a power driven cutter mounted for controlled movement in both vertical and horizontal directions with respect to the bed and with respect to the work over which it is moved.

One of the objects of the present invention is to provide a novel type of woodworking tool capable of accurate control in forming predetermined contours in the work.

Another object of the invention is to provide a portable tool which includes a power driven cutter that is guided in its movement in both horizontal and vertical directions.

A further object of the invention is to provide a portable tool which is capable of guided movement in forming a great variety of contours, cavities or shapes on the work.

A particular object of the invention is to provide a novel type of core box cutter capable of forming a great variety of shapes and contours in wood.

These and other objects and features of the present invention will appear from the following description thereof in which reference is made to the figures of the accompanying drawings.

In the drawings:

Fig. 1 is a front elevation of a typical form of tool embodying the present invention;

Fig. 2 is a top plan view of that form of tool illustrated in Fig. 1;

Figure 5:
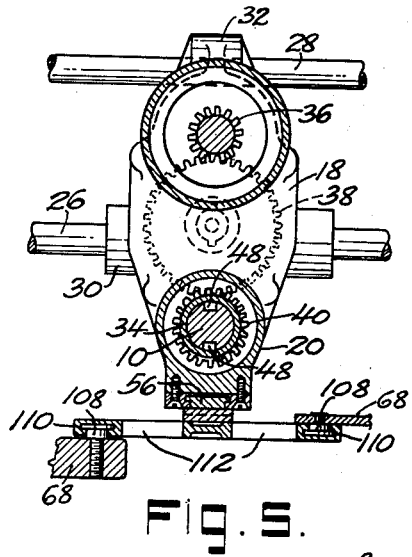
Fig. 5 is a horizontal sectional view taken on the lines 5—5 of Fig. 1.

In that form of the invention chosen for purposes of illustration in Figs. 1 to 9 of the drawings the tool is provided with an open bed frame 2 which preferably is of rectangular form and has a lower face 4 which is flat or otherwise formed to engage the upper face of the workpiece 6 or rails 8 fixed with respect to the workpiece to insure movement of the tool over the workpiece in a predetermined relation with respect thereto. The open construction of the bed frame 2 permits extension therethrough of a spindle shaft 10 in such manner as to provide for cutting operations on the workpiece below the bed frame by a tool or cutter 12 carried by the spindle shaft 10.

The spindle 10 is driven by a motor 14 mounted within a carriage 16 which has a gear box 18 and spindle housing 20 provided with spindle bearings 22 and 24. The carriage 16 is guided for horizontal movement with respect to the bed frame 2 by means of the transversely extending parallel rods 26 and 28 which are mounted on the frame and engaged by the guide brackets 30 and 32 respectively formed integral with the carriage 16.

The spindle 10 is slidably mounted for axial movement within a driving sleeve 34 while being driven from the motor 14 through gear 36, idler gear 38 and the pinion 40 which is formed integral with or secured to the driving sleeve within the gear housing 18. The driving connection between the spindle 10 and driving sleeve 34 is established by means of gibs or lugs 42 carried by the driving head 44 on the driving sleeve and extending into the keyways or slots 46 extending lengthwise of the spindle on opposite sides thereof. Incidentally, the driving head 44 is secured to the driving shaft by a left hand thread so that it constantly tends to tighten and it serves to hold the inner bearing race of bearing 22 in place while the outer race is held in place by the collar 50.

The upper end of the spindle 10 is supported by a bearing assembly 52 mounted in a collar 54 secured to an actuating bar 56 which serves to control the vertical movements of the spindle and cutter during all of the cutting operations. However, vertical movement of the spindle and cutter may be limited during some operations by means of a threaded stop rod 58 which is mounted on bracket 60 secured to spindle housing 20 and projects upward through bracket 62 on collar 54 and is provided with adjustable upper and lower limiting nuts 64 and 66 respectively.

By this construction, the carriage as a unit, including a motor, gear box and spindle housing as well as spindle 10 and actuating bar 32 is movable horizontally and transversely of the bed frame 2 while being guided in such movements by the rods 26 and 28. At the same time the spindle 10 and cutter 12 are movable vertically and are guided in such vertical movements by the actuating bar 56. By controlling both the vertical spindle movement and the horizontal carriage movement, a core box or other articles can be formed with a contour having a cross section of any desired shape, it being understood, of course, that a wood working cutter, such as a router, is mounted on the spindle below the bed to engage the workpiece 6 over which the tool is moved.

Figure 6:
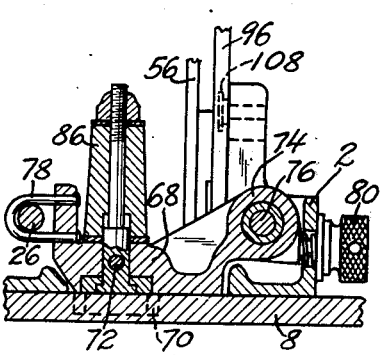
Fig. 6 is a detail section taken on lines 6—6 of Fig. 2.

In order to guide the tool for movement along the workpiece to make an elongated cavity or contour within the area to be worked, the lower face 4 of the bed frame 2 of the tool is designed to bear against and be supported upon the upper face of the work or upon rails 8 secured to the upper face of the workpiece 6. Rail engaging slides 68 are carried by the tool and are provided with followers 70 which project below the lower face 4 of the bed frame into position to engage the inner faces of the guide rails 8. As best shown in Fig. 6 precision adjustment of the followers 70 with respect to the slides 68 is readily secured by means of a transverse adjusting screw 72. The slides 68 are each provided with a front guide sleeve 74 which is longitudinally slidable along a front guide rod 76 mounted on the bed frame and extending parallel to the guide rods 26 and 28. A second or rear guide sleeve 78 is slidable along the intermediate guide rod 26 to provide support for the slide 68 and insure accurate movement and positioning thereof. The slides are movable toward and away from each other transversely of the bed frame so as to bring the followers 70 into engagement with the inner side edges of the guide rails 8 and when desired may be secured in any predetermined spaced relation by clamping screws 80 on which are movable the bolts 82 which are carried by the slides 68 and project through longitudinal slot 84 in the front face of the bed frame 2.

The slides 68 are provided with handles 86 by which the tool may be moved along the guide rails 8 when forming an elongated cavity such as a core box and by which the slides and followers 70 may be moved toward and away from each other between the guide rails 8. When the cavity or contour to be formed is of uniform width throughout its length, the rails 8 are arranged parallel to each other and on opposite sides of the area of the workpiece in which the cavity is to be formed. If the cavity is to taper throughout its length or is to be of irregular width, the rails are correspondingly arranged in inclined relation or are irregularly shaped to correspond to the width of the cavity to be produced. The distance the rails are spaced apart in any case should be such that when the slides are moved apart sufficiently to cause the followers to engage both rails, the cutter will be capable of movement back and forth between the slides and its outer surface will exactly define the inner face of the desired cavity. As shown most clearly in Fig. 9 the rails 8 are actually spaced apart a distance so that when each is engaged by an opposite follower 70, the amplitude of movement of the cutter is equal to the width of the cavity to be produced less the diameter of the cutter.

Figure 3:
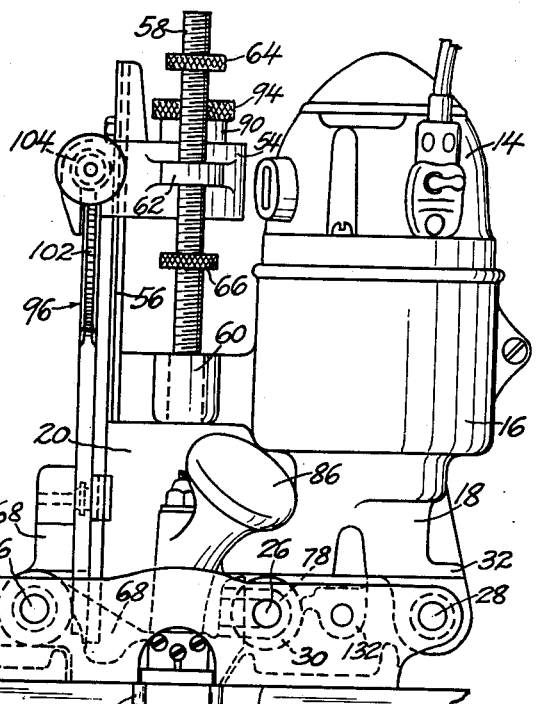
Fig. 3 is an end elevation of the tool illustrated in Figs. 1 and 2.
Figure 4:
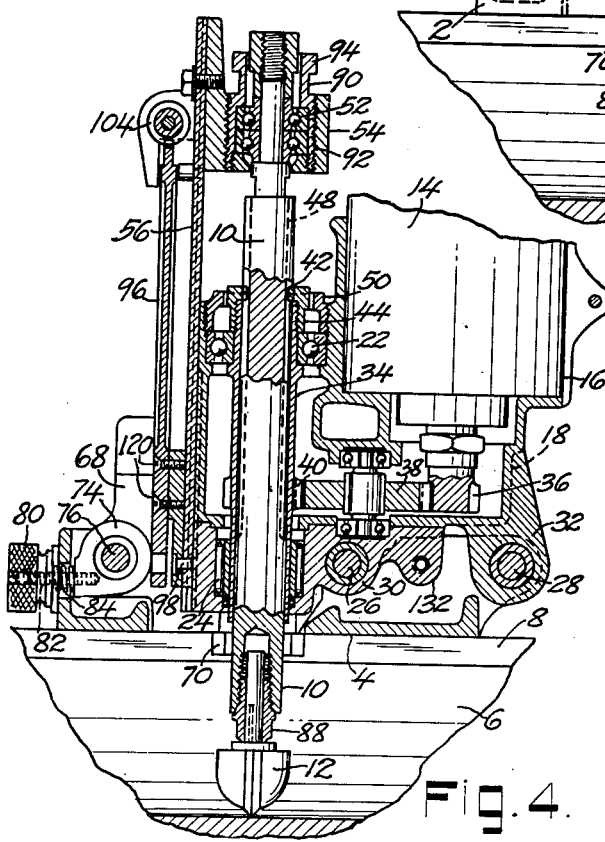
Fig. 4 is a central vertical section taken on the lines 4—4 of Fig. 2.

In various operations for which the present tool is adapted different types of cutters may be employed varying in shape from the router 12 as exemplified by the square cutter shown in dotted lines in Fig. 3. The lower end of the spindle 10 is therefore provided with a chuck 88 for detachably receiving a cutter of the desired shape. Furthermore, in order to vary the location of the cutter surface with respect to the work as various types and styles of cutters are employed, the spindle 10 is preferably provided with a vertical adjustment with respect to the actuating bar 56. For this purpose the bearing assembly 52 adjacent the upper end of spindle 10 may be raised or lowered together with the spindle itself by rotating an externally threaded thrust bearing carrier 90 which engages internal threads 92 on the collar 54. A knurled head 94 on the upper end of the bearing carrier permits such adjustments to be made easily and independently of the driving connections between the spindle 10 and the driving sleeve 34. The thumb nut 95 permits tightening of the collar 54 to hold the bearing assembly in any adjusted position.

Although the tool as thus described may be used in roughing out a core box or for various other purposes, in order for definite and accurate dimensions to be maintained the tool preferably is provided with means for limiting and controlling the vertical movement of the cutter during the transverse movement of the carriage with respect to the bed frame 2.

In a great many core boxes, the cavity to be formed is substantially semi-circular in cross section and it is the practice of workmen to use a steel square or triangle for testing the accuracy of the work. The control means of the present invention uses this general principle for guiding and limiting the movements of the cutter and for this purpose the actuating bar 56 by which the spindle bearing assembly 52 and the spindle itself are moved vertically is provided with a quadrant plate 96. The lower right angled corner of the quadrant plate is pivotally connected to the actuating bar 56 by means of the pivot pin 98, whereas the upper arcuate portion 100 of the quadrant plate is provided with worm gear teeth 102 engaged by a worm 104 mounted on the collar 54 to which the upper end of the actuating bar is secured. The worm 104 is provided with a handle 106 and thus the quadrant plate can be rotated about the pivot pin 98 to any angular position desired with respect to the actuating bar 56.

Such angular movement of the quadrant plate is utilized to control both vertical and transverse movement of the actuating bar and the spindle 10 by providing the slides 68 with rollers 108 which ride in grooves 110 in the right angularly extending sides 112 of the quadrant plate 96. As shown the groove 110 on the right hand side 112 of the quadrant plate as seen in Fig. 5 faces rearwardly and the roller 108 on the right hand slide 68 projects forwardly into the groove, whereas the left hand side of the quadrant plate has a forwardly facing groove 110 and the roller 108 on the left slide projects rearwardly into the groove 110. Obviously these grooves and rollers may be oppositely arranged or positioned on the same face at either the front or rear of the quadrant plate as desired, it only being required that they cooperate as a template and follower.

The rollers 108 and the pivot pin 98 combine to provide points which control the vertical movement and horizontal movement of the actuating bar, spindle and cutter whereby pivotal movement of the quadrant plate will vary the elevation of the cutter while the relative spacing of the slides 68 and rollers 108 will determine the amplitude of the vertical and horizontal movement during tilting of the quadrant plate.

From a consideration of this structure it will be seen that with the slides 68 held in fixed positions by nuts 80 and the actuating bar 56 free to move vertically within its ways, rotation of the worm 104 will rock the quadrant for pivotal movement on the pivot pin 98. Assuming such motion to be in a clockwise direction from the 90° central position with the quadrant vertical as seen in Fig. 1, the right hand groove 110 will slide downwardly on the right hand roller 108 which is relatively fixed by the securing of its slide 68. Conversely, the left hand groove 110 will slide upwardly on its roller 108 and in so doing the apex of the quadrant 96 and with it the pivot pin 98 will travel towards the left in an upwardly inclined arc. The pin 98 being secured to the actuating bar 56 will impart vertical motion to the bar and therethrough to the spindle 10 to raise the same. At the same time horizontal movement will be transmitted to the carriage which is slidable transversely of the bed frame on bars 26 and 28.

Figure 7:
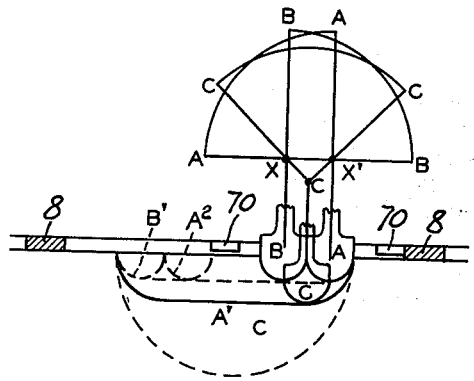
Figs. 7, 8 and 9 are diagrammatic illustrations indicating the manner of operation of the device shown in Figs. 1 to 6.
Figure 8:
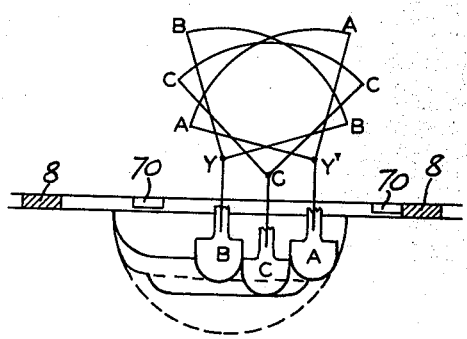
Figure 9:
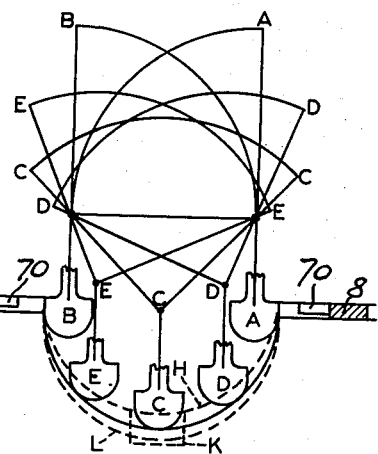

The nature of this control and the manner in which the tool may be used to form a core box of semi-circular cross section will be apparent from the diagrammatic illustrations in Figs. 7, 8 and 9. In Fig. 7 the slides and followers 70 are positioned relatively close together and the rollers are in the positions indicated at X and X'. When so located tilting of the quadrant to the position A will cause the pivot pin 98 to move to a position coinciding with (but behind) the roller X', whereas the cutter will be located in the position A for making an initial shallow cut. Upon moving the tool back and forth over the work and between the rails 8 the cutter will form a groove or cavity indicated by the dotted line A'. On moving the cutter to the right until the right hand follower 70 engages the right hand rail 8 the cutter will accurately define the right hand edge of the finished cavity and on moving the tool lengthwise of the work along the rails the upper right hand edge of the entire core box can be completed.

As the tool is moved toward the left hand side of the work a shallow cavity is formed but on engagement of the left hand follower 70 with the left hand rail 8, the cutter will be spaced from the left side of the finished cavity a short distance as indicated by the left end of the dotted line indicated at A2. The quadrant is then rotated through substantially 90° by means of a worm 104 and handle 106 until it assumes the position B of Fig. 7 wherein the pivot pin 98 coincides with the point X. The carriage 16 is thus moved to the left along guide rods 26 and 28 until the cutter is located in the position B with respect to the tool. Thereafter when the left follower 70 is moved over to engage the left rail 8, the final marginal cut on the left side of the cavity will be made as indicated at B' to define the final width of the cavity with complete accuracy.

After completing this initial shallow cut throughout the area of the workpiece in which the cavity is to be formed, the quadrant plate is tilted back to the position C in which the carriage 16 is moved back to a central position between the slides and the pivot pin 98 is located below and between the rollers 108. This movement serves to cause the spindle and cutter to be lowered to make a deeper cut. However, the point C is spaced inward from the points X and X' so that as the cut is deepened its width is reduced and as a result the desired semi-circular cross section of the cavity is established and maintained with the utmost accuracy.

When the cut of Fig. 7 has been completed the slides 68 and rollers 108 are moved apart and fixed by the retaining nuts 80 at the positions represented in Fig. 8 at Y and Y'. Operations similar to those described in connection with Fig. 7 are then repeated, moving the quadrant plate successively to the positions A, B and C to make successive cuts of progressively increasing depth while the contour in cross section of the cavity is always controlled accurately.

Fig. 9 illustrates the position of the elements when making the final and finishing cut for a core box of semi-circular cross section. The slides and followers 70 are then spread the maximum distance permitted by the rails 8 and the quadrant plate may be moved back and forth a full 90° through the positions A, D, C, E and B without danger of over cutting. In fact, such movement assures complete and accurate routing of the cavity to more nearly exact dimensions than is possible with hand operations.

It will of course be understood that the quadrant plate need not be swung fully to the positions A, B and C of Figs. 7, 8 and 9 without making intermediate cuts and in practice the quadrant is preferably graduated and moved through angles of say 5 or 10 degrees progressing from one depth and position of the carriage and cutter to another. The B cut on the left hand side may in fact be the final cut after completing the deeper center cut C if desired. However, in any case the position of the cutter and actuating bar is determined and controlled at all times by the pivot point 98 and the rollers 108 functioning in combination to establish the path of movement of the elements within the cross sectional area of the cavity.

When using the construction described the cavity may be given a contour which is somewhat less than a semi-circle in cross section by raising the cutter and spindle with respect to the pivot pin 98 by suitable rotation of the knurled head 94 to raise the spindle and cutter. A "high" cut as shown at H in Fig. 9 will then be produced, whereas lowering of the cutter by opposite rotation of the head 94 will produce a "low" cut as shown at L in Fig. 9, forming a cavity which has parallel upper edges and a lower semi-circular contour. Further, by using a square cutter and making a "low" cut, a keyway or other groove or depression may be formed in the core box as illustrated in dotted lines at K in Fig. 9.

Consideration of Figs. 7, 8 and 9 will also make it apparent that core boxes or cavities of tapered or irregular width and depth but having semi-circular cross section can be produced with the construction described. Thus, a tapering cavity may be formed by arranging the rails 8 in inclined relation so that at one end of the work they are spaced apart a distance which prevents separation of the followers 70 a distance greater than that corresponding to the points X and X'. The width and depth of the cavity at that end of the work then will be no greater than the first cut, whereas at an intermediate point the cavity will have the cross section of Fig. 8 and at the opposite end it will have the cross section of Fig. 9.

By resorting to other arrangements of the rails 8 it is possible to form a cavity with a large intermediate width and depth such as that of Fig. 9 and lesser width and depth at other portions thereof corresponding to Figs. 7 or 8. It will also be apparent that the rails 8 do not have to be used in every case and the lower face 4 of the bed frame 2 may engage the work directly. The followers 70 at such times may be reversed to engage opposite sides of the workpiece itself or if desired the followers may be removed altogether and the tool may be guided longitudinally of the work by hand or by other suitable means to form a cavity of desired contour.

Figure 10:
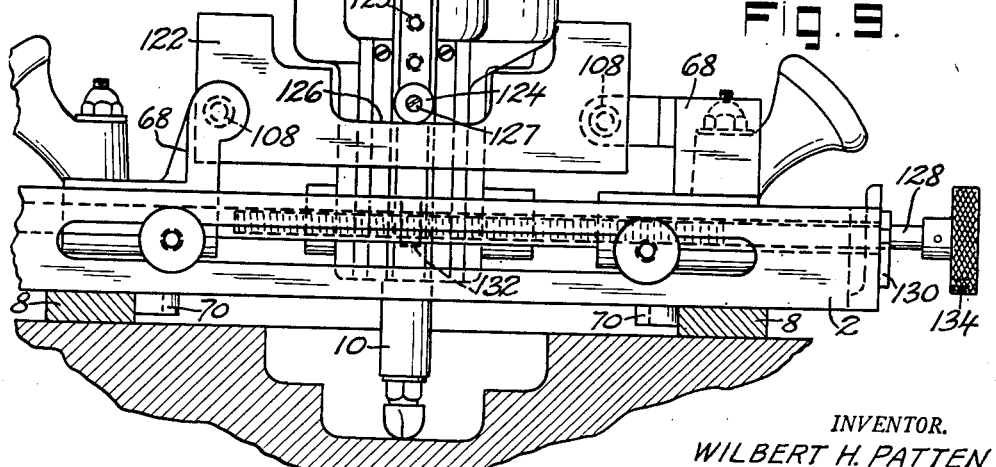
Fig. 10 is a front elevation of an adaptation of the device for use with a template for forming cavities of irregular cross section.

When it is desired to use the tool of the present invention to form core boxes, cavities or contours on the work which have a cross section other than a semi-circular form, the quadrant plate 96 which functions as a template controlling the movement of the cutter in the construction shown in Figs. 1 to 9 is removed by removing the screws 120 by which the quadrant is secured to the actuating bar 56. The slides 68 are moved outward until both followers 70 engage the rails 8 and a template 122 is then secured to the slides 68 by attachment to or over the rollers 108 as shown in Fig. 10. A stylus or roller 124 is secured to the actuating bar 56 by means of the screws 127 engaging one of the tapered holes 125. The roller 124 is arranged to project forward from the actuating bar into position to engage and bear against the upper guiding edge 126 of the template 122. The guiding surface of the template is of course shaped to define the cross section of the cavity or contour to be formed in the workpiece.

Figure 11:
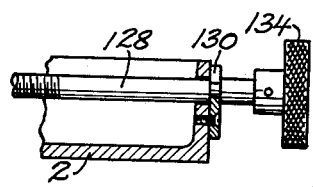
Fig. 11 is a detail section showing the means for mounting and actuating the traversing rod when a template is used.

The vertical movement of the actuating bar and roller 124 and the vertical movement of the cutter are controlled by limit nuts 64 and 66 on the stop rod 58 mounted on carriage 16. Transverse movement of the carriage and cutter is effected by means of a transverse screw 128 which as shown in Figs. 10 and 11 extends across the bed frame from one side to the other and is held against longitudinal movement by means of the keeper 130. The transverse screw passes through a threaded opening in the downwardly projecting lug 132 on the carriage so that rotation of the transverse screw will cause the carriage and cutter to be moved transversely of the bed frame, whereas vertical movement of the cutter will be controlled by the roller 124 engaging the upper guiding edge 126 of the template 122. The transverse screw may be rotated by means of a nob 134 secured to the end of the transverse screw.

In making the initial cut when using the construction of Fig. 10, the lower limiting nut 66 is turned up to an elevated position which will permit the cutter to make only a shallow cut in the work. The transverse movement of the cutter is effected by rotation of the transverse screw, whereas the tool is held against lateral movement by the followers 70 engaging rails 8 and the template precludes movement of the cutter beyond the edges of the cavity as determined by the form of the upper guiding edge of the template. After the cutter has been moved transversely and longitudinally of the workpiece so as to form an initial cut the limiting nut 66 is turned down a sufficient distance to enable the cutter to make a deeper cut in the workpiece. At the same time the template prevents over cutting of the work by limiting the downward movement of the cutter in those areas wherein the cavity is to be relatively shallow. By movement of the cutter transversely through operation of the transverse screw while the tool is moved lengthwise of the work, the depth of the cut can be gradually increased while its contour in cross section is limited and controlled by the roller 124 on the actuating bar engaging the upper guiding edge 126 of the template 122.

In this way a cavity of any desired cross section can be formed in the workpiece and by the use of suitable cutters having either spherical or cylindrical heads, the cavity may be given rounded or sharp corners as required. It will also be apparent that the longitudinal movement of the tool may be limited by suitable stops (not shown) so as to form a cavity of a predetermined cross section in one area of the workpiece after which the template may be changed and the tool moved to a longitudinally adjacent area to form an adjacent portion of the cavity having an entirely different shape in cross section. Thus a workpiece may be given substantially any form of cavity or contour so as to permit the most accurate formation of the workpiece using a minimum of skill, judgment and control on the part of the person using the tool. The accuracy of the finished product will exceed that attainable with hand operations since the template may be formed with the greatest accuracy and the cutter will be caused to move exactly as determined by the template whether the template is in the form of a quadrant plate as shown in Fig. 1 or is of irregular form as shown in Fig. 10.

The type of cutter used and the form, shape and arrangement of the rails or supports over which the tool is moved may of course be varied to produce core boxes, patterns or articles having a great variety of shapes and contours. In view thereof, it should be understood that the particular form of the tool and its elements and accessories may be varied greatly in form and arrangement without departing from the spirit and scope of the invention. It should therefore be understood that the particular styles and designs of tools shown in the drawings and described above are intended to be illustrative only and are not intended to limit the invention.

I claim:

1. A woodworking tool for forming a contour of predetermined cross section in a surface of a workpiece, said tool comprising a bed frame movable over said surface, a carriage mounted on said frame and movable relative thereto in a plane parallel to said surface, a cutter carrying spindle movable with said carriage, means for driving said spindle, actuating means for moving the spindle parallel to its axis and with respect to said carriage toward and away from said surface, a template carried by said tool, and means connected to said actuating means and engageable with said template limiting movement of the carriage and spindle to positions defining said predetermined cross section.

2. A woodworking tool for forming a contour of semi-circular cross section in a surface of a workpiece, said tool comprising a bed frame movable over said surface of the workpiece and having guide means thereon, a carriage movable along said guide means in a direction parallel to said surface, a cutter carrying spindle mounted on said carriage and movable in a direction at right angles to the direction of movement of said carriage, means for driving said spindle, an actuating member connected to said spindle for moving it toward and away from said surface, a quadrant plate having pivot means located adjacent the apex thereof and connected to said actuating member, cooperating means on said frame engageable by right angularly disposed portions of the quadrant plate on opposite sides of said apex, said quadrant plate being movable about said pivot means whereby movement of said spindle is limited to a semicircular area defining said cross section.

3. A woodworking tool for forming a contour of semi-circular cross section in a surface of a workpiece, said tool comprising a bed frame movable over said surface of the workpiece and having guide means thereon, a carriage movable along said guide means in a direction parallel to said surface, a cutter carrying spindle mounted on said carriage and movable in a direction at right angles to the direction of movement of said carriage, means for driving said spindle, an actuating member connected to said spindle for moving it toward and away from said surface, a quadrant plate having pivot means located adjacent the apex thereof and connected to said actuating member, means adjustable toward and away from each other in a direction parallel to said guide means and engaging right angularly disposed portions of the quadrant plate on opposite sides of said apex to control pivotal movement of said quadrant plate, and means for moving said quadrant plate about said pivot whereby movement of said spindle is limited to a semicircular area defining said cross section.

4. A woodworking tool for forming cavities of predetermined cross section in a surface of a workpiece, said tool comprising a bed frame, means for limiting movement of said frame within a plane parallel to the surface of the workpiece in which a cavity is to be formed, guide means on said bed frame, a carriage movable along said guide means in a direction parallel to said plane, a cutter carrying spindle mounted on said carriage and movable with respect thereto toward and away from said plane, a motor mounted on said carriage, driving connections between the motor and spindle, a template carried by said tool and formed to define the cross section of the cavity to be produced, and actuating means connected to said spindle and engaging said template to limit movement of the spindle with respect to said carriage.

5. A woodworking tool for forming cavities of predetermined cross section in a surface of a workpiece, said tool comprising rails attachable to the workpiece on opposite sides of the area thereof in which a cavity is to be produced, a bed frame movable longitudinally of said rails, means on the bed frame limiting transverse movement of the bed frame with respect to said rails, guide means on said frame extending to said rails, a carriage movable along said guide means, a cutter carrying spindle mounted on said carriage and movable toward and away from the workpiece, a motor mounted on said carriage, driving connections between the motor and spindle, a template carried by said tool and formed to define the cross section of the cavity to be produced, and actuating means connected to said spindle and engaging said template to limit movement of the spindle with respect to said carriage.

6. A woodworking tool for forming a cavity in a workpiece comprising a bed frame movable over the workpiece, a carriage mounted on the bed frame and movable in a direction from one side of the frame to the other, a cutter carrying spindle mounted on said carriage and movable with respect thereto in a direction at right angles to the direction of movement of the carriage on said frame, means for driving said spindle, actuating means for moving the spindle with respect to the carriage, and control means including a template and follower interposed between said frame and actuating means and engageable to limit movement of the spindle and carriage with respect to the bed frame.

7. A woodworking tool comprising a bed frame presenting a surface for movement over a workpiece, a carriage mounted on said bed frame and movable in a direction parallel to said surface, a cutter carrying spindle mounted on said carriage and movable in a direction parallel to its axis to cause a cutter carried thereby to project beyond said surface into position to engage a workpiece, and a template and follower interconnected between the bed frame and spindle and relatively movable to control movement of the carriage and spindle with respect to said frame.

8. A woodworking tool comprising a bed frame presenting a surface for movement over a workpiece, a carriage mounted on said bed frame and movable in a direction parallel to said surface, a cutter carrying spindle mounted on said carriage and movable to cause a cutter carried thereby to project beyond said surface into position to engage a workpiece, a quadrant plate connected to said spindle and movable about a pivot located adjacent the apex thereof, rollers engaging said quadrant plate adjacent the right angularly disposed sides of the quadrant plate on opposite sides of said apex, means for holding said rollers in predetermined positions with respect to the bed frame, and means for moving the quadrant plate about said pivot to move the spindle through an arcuate path.

9. A woodworking tool comprising a bed frame presenting a surface for movement over a workpiece, a carriage mounted on said bed frame and movable in a direction parallel to said surface, a cutter carrying spindle mounted on said carriage and movable to cause a cutter carried thereby to project beyond said surface into position to engage a workpiece, a quadrant plate connected to said spindle and movable about a pivot located adjacent the apex thereof, slides movable in a direction parallel to that in which the carriage is movable and having rollers thereon engaging the quadrant plate adjacent the right angularly disposed sides of the quadrant plate on opposite sides of said apex, means for holding said slides and rollers in predetermined spaced relation, and means for moving the quadrant plate about said pivot to move the spindle through an arcuate path.

10. A woodworking tool for forming a cavity in a workpiece comprising a bed frame movable over the workpiece, rails attachable to the workpiece on opposite sides of the area in which a cavity is to be formed, means on the bed frame limiting movement of the frame transversely of said rails, a carriage mounted on the bed frame and movable in a direction from one side of the frame to the other, a cutter carrying spindle mounted on said carriage and movable with respect thereto in a direction at right angles to the direction of movement of the carriage on said frame, means for driving said spindle, actuating means for moving the spindle parallel to its axis and with respect to the carriage, and control means limiting movement of the carriage and spindle with respect to said bed frame.

11. A woodworking tool for forming a cavity in a workpiece comprising a bed frame movable over a workpiece, rails attachable to the workpiece on opposite sides of the area of the workpiece in which a cavity is to be formed, means on the bed frame limiting movement of the frame transversely of said rails, a carriage mounted on the bed frame and movable in a direction from one side of the frame to the other, a cutter carrying spindle mounted on said carriage and movable with respect thereto in a direction at right angles to the movement of the carriage on the frame, means for driving said spindle, actuating means for moving the spindle with respect to the carriage, a quadrant plate connected to said actuating means and movable about a pivot located adjacent the apex thereof, rollers engaging said quadrant plate adjacent the right angularly disposed sides of the quadrant plate on opposite sides of said apex, means for holding said rollers in predetermined positions with respect to the bed frame, and means for moving the quadrant plate about said pivot to move the spindle through an arcuate path.

12. A woodworking tool for forming a cavity in a workpiece comprising a bed frame movable over a workpiece, rails attachable to the workpiece on opposite sides of the area of the workpiece in which a cavity is to be formed, means on the bed frame limiting movement of the frame transversely of said rails, a carriage mounted on the bed frame and movable in a direction from one side of the frame to the other, a cutter carrying spindle mounted on said carriage and movable with respect thereto in a direction at right angles to the movement of the carriage on the frame, means for driving said spindle, actuating means for moving the spindle with respect to the carriage, a quadrant plate connected to said actuating means and movable about a pivot located adjacent the apex thereof, slides movable in a direction parallel to that in which the carriage is movable and having rollers thereon engaging the quadrant plate adjacent the right angularly disposed sides of the quadrant plate on opposite sides of said apex, means for holding said slides and rollers in predetermined spaced relation, and means for moving the quadrant plate about said pivot to move the spindle through an arcuate path.

References Cited in the file of this patent

UNITED STATES PATENTS

| Number | Name | Date |
|---|---|---|
| 1,234,015 | Halterbeck | July 17, 1917 |
| 1,506,154 | Berthelsen et al. | Aug. 26, 1924 |
| 1,674,602 | Madsen | June 19, 1928 |
| 1,899,883 | Sacrey | Feb. 28, 1933 |
| 2,047,603 | Tremblay | July 14, 1936 |
| 2,258,828 | Trebert | Oct. 14, 1941 |

FOREIGN PATENTS

| Number | Country | Date |
|---|---|---|
| 130,214 | Switzerland | Jan. 16, 1929 |
| 138,374 | Switzerland | May 1, 1930 |